3,300,283
CONTROLLED WAVE REACTOR EMPLOYING
RUPTURABLE MEANS
James L. Lauer, Penn Wynne, and William B. Hansel, Media, Pa., assignors to Sun Oil Company, Philadelphia, Pa., a corporation of New Jersey
Filed Apr. 24, 1964, Ser. No. 362,336
3 Claims. (Cl. 23—284)

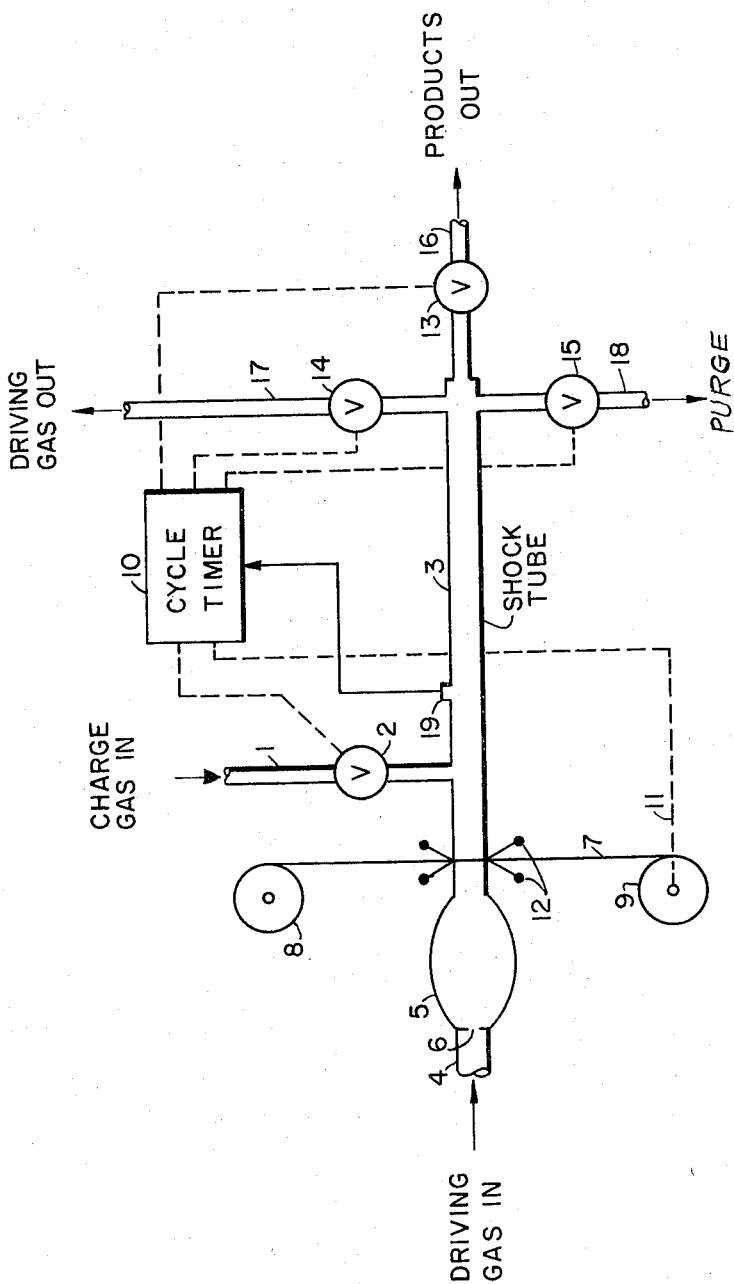

This invention relates to a chemical reactor wherein certain endothermic chemical reactions may be carried out by subjecting the reactant material to one or more mechanical shock waves, thereby to produce a high temperature in such reactant material for a very short period of time. Such a reactor may be thought of as a wave engine.

The wave engine of the invention may be used for many different chemical reactions. By way of example, hydrogen cyanide and acetylene may be prepared, using carbonaceous, hydrogenous and nitrogenous material (e.g., a mixture of methane and nitrogen) as the reactant material.

One type of wave engine which has previously been devised is based upon a shock tube (employing mechanical shock waves) which rotates adjacent to a stationary set of orifices or ports through which driving gas, charge gas, etc. are admitted and products are withdrawn. In such an engine, shock waves are generated when the orifice on the stator to which is supplied the driving gas at high pressure comes into communication with the shock tube (which at that time is filled with process or charge gas at low pressure), which latter is rotating at high speed. Only a sudden contact of short duration will give rise to a shock wave; this requires a very high speed of rotation of the shock tube.

A great many of the problems associated with the design of a wave engine of the type described are attributable to the high speed of rotation which is required for the shock tube. For example, it is rather difficult to provide tight seals in such a high-speed rotating machine. Again, the measurement of temperature and pressure inside the rotating tube (such measurement being desired to be made for research purposes) is quite difficult. It is also difficult to provide a heat exchange arrangement for such a rotating tube.

The removal of the driving gas that entered the shock tube, of the reaction products, and of the unreacted process gas (which removal is effected after the shock wave has been produced and utilized) is done in the prior machine by expansion from the tube into other orifices, which latter can be much longer (in the direction of travel of the tube) than the high-pressure driving gas orifice because the expansion process is much slower than the compression process; in fact, it is about an order of magnitude slower.

An object of this invention is to provide a new and improved wave engine.

Another object is to provide a novel wave engine which employs a stationary shock tube.

According to the present invention, the shock tube is stationary, and the driving gas, product-gases, etc. are removed by suitably controlled valve means, after the shock wave has passed through the tube. The shock wave is generated by bursting of a tape which passes across one end of the shock tube, and which forms a frangible closure separating this end of the shock tube from a high pressure driving gas chamber. The frangible closure will rupture or burst whenever the pressure in the driving gas chamber section exceeds a preset value.

A detailed description of the invention follows, taken in conjunction with the accompanying drawing, wherein the single figure is a somewhat diagrammatic illustration of a wave engine arrangement according to the invention.

It has been found that it is possible to convert natural gas (methane) into acetylene, or mixtures of natural gas and nitrogen into hydrogen cyanide and acetylene, by heating the reagents quickly to temperatures above 3500° F., the heating to be almost immediately followed by cooling or quenching to a temperature not substantially greater than 1600° F., the cooling rate being comparable to the heating rate. More specifically, a mixture of equal parts by volume of nitrogen and methane can be converted to a mixture consisting of acetylene (12% by volume), hydrogen cyanide (5%), hydrogen (45%), nitrogen (33%), and methane (5%), at a power plus heat cost of 2.2 cents per pound of acetylene/hydrogen cyanide mixture.

The required heating and cooling may be conveniently effected in a shock tube. A shock tube is a pipe in which a gas or a gas mixture (termed the process gas) can be heated very rapidly to very high temperatures by another gas, the driving gas, adiabatic compression being the heating mechanism. That is to say, the process involves adiabatic compression of the process gas by another gas, the driving gas, which latter works in a way similar to a mechanical piston. The heating is followed almost immediately by rapid cooling through expansion. If there is a sequence of equivalent independent shock tube processes, the result is essentially a continuous flow process.

The gas or mixture of gases which is acted upon in the shock tube may be termed the reagents, a process gas, a reactant mixture, a charge gas, a reactant material, or a process mixture.

Referring now to the drawing, a charge gas (which may be a mixture of equal parts by volume of nitrogen and methane), at atmospheric pressure and 890° F., can be fed through line 1 and valve 2 (when valve 2 is open) into one end of an elongated reaction tube (shock tube) 3. Assume for the moment that valve 2 is open; how this valve is controlled from a cycle timer 10 will be described hereinafter. Although item 3 is termed a "tube," it does not necessarily have a circular cross-section; it can have any other cross-section, such as square, or rectangular.

A driving gas, for example hydrogen at twenty-two atmospheres absolute and 1040° F., is fed in a more or less continuous manner through a line 4 into a pressure chamber 5, by way of an orifice inlet 6 which delays the buildup of pressure in chamber 5. Chamber 5 is aligned with tube 3, so that the outlet end of the chamber can come into communication with one end of the shock tube. The outlet end of chamber 5 is across the chamber from inlet orifice 6.

A movable tape 7 is mounted to move across the end of tube 3 which is adjacent chamber 5. Tape 7 thus, in effect, forms the boundary between chamber 5 and tube 3, and thus provides a partition between the driving gas, contained in chamber 5, and the process gas (charge gas) then in tube 3. The tape 7 travels from a suppy reel 8 to a take-up reel 9, the movement of take-up reel 9 being controlled from a cycle timer 10 in a manner to be described hereinafter, through a coupling schematically indicated at 11. Between reels 8 and 9, tape 7 passes into and out of the confined space (provided by chamber 5 and tube 3) by way of suitable seals schematically indicated at 12.

The tape 7 can comprise a steel tape with a plurality of spaced holes therein, in each of which is inserted a thinner, frangible material. Thus, the tape can be said to carry a plurality of frangible discs; each disc has approximately the same cross-section as tube 3, so that the discs can form successive individual closures for the left-hand or chamber end of tube 3, as each disc is successively moved into position by the tape.

The thinner, frangible material can be inserted into the holes in tape 7, to form discs, at a time much earlier than the time of use of such discs as closures, or the material can be inserted just prior to the entry of the tape into the confined space.

Assume that at some reference instant which may be thought of as zero time, a frangible disc closure (carried by tape) 7 is in place to seal the left-hand end of tube 3 (and also to seal the right-hand end of chamber 5), that tube 3 is filled with charge gas, and that the pressure in chamber 5 is low (substantially one atmosphere absolute). As the high pressure driving gas passes into chamber 5 through orifice 6, the pressure slowly builds up in this chamber, at a rate determined in part by the size of orifice 6. When the pressure in chamber 5 exceeds a preset value, the disc closure exposed thereto suddenly burst or ruptures, producing a shock wave (of the driving gas) which travels through shock tube 3, toward the right-hand end thereof. The perfection of the shock wave produced will be determined by the rapidity with which the disc closure ruptures; it will not be determined by the lateral motion of the tape between reels 8 and 9. This latter motion is only required to limit the amount of driving gas flowing into the shock tube 3.

The ruptured discs can be ejected from the tape after the tape leaves the confined space 3, 5 by any well-known means, and new discs can be inserted; if this is done, the tape 7 can be of the endless type. Or, alternatively, the tape carrying the ruptured discs can be reworked (to provide new, imperforate frangible discs) and threaded into the machine, after the old tape is used. In any event, the ruptured material can be salvaged, and used as the basic material for the manufacture of new discs.

It has previously been stated that the rupture or bursting of a disc closure results in the creation of a shock wave in the reaction tube (shock tube) 3, and that this shock wave passes down the tube toward the right-hand end thereof. The shock wave adiabatically compresses the charge gas mixture (e.g., a methane-nitrogen mixture) contained in the tube, with a resulting rapid increase in temperature (to a temperature above 3500° F.). At this rather high reaction temperature, the methane and nitrogen react to form hydrogen cyanide and acetylene, with hydrogen as a by-product.

Valved means are provided at the right-hand end of the reaction tube for removing the product gases, for removing the driving gas, and for allowing purging of the tube (while a new charge is being admitted to the tube). This valved means can be of any suitable type. For the sake of simplicity, it is illustrated as comprising three separate solenoid-operated valves 13, 14, and 15, each of which is controlled from the aforementioned cycle timer 10 by means of a separate control connection, the control connections being illustrated by dotted lines. Valve 13 is in a "products out" line 16; when valve 13 is open, the right-hand end of tube 3 is placed in communication with line 16. Valve 14 is in a "driving gas out" line 17; when valve 14 is open, the right-hand end of tube 3 is placed in communication with line 17. Valve 15 is in a "purge" line 18; when valve 15 is open, the right-hand end of tube 3 is placed in communication with line 18.

Alternatively, the valved means may comprise a rotating disc valve of the type disclosed in the copending application, Serial No. 405,161, filed October 20, 1964. Such a rotating valve would only have to take care of the expansion cycle of the wave engine. Hence, its speed of rotation could be relatively small, approximately $1/10$ of the speed of rotation of the shock tube in the prior wave engine design referred to hereinabove.

After the shock wave is generated as above described and the compression chamber 5 is evacuated (as a result of rupture of the frangible disc closure on tape 7), a new disc closure is moved into place by the continuous tape 7, as previously described. The pressure again builds up in chamber 5 until this new disc ruptures, then the process repeats.

While each shock wave is thus being generated and is traveling down the tube 3, valves 13, 14, and 15 are all closed, so that the process gas is compressed by the shock wave, as previously described. This causes the desired chemical reaction or reactions to take place. When the shock wave reaches the closed right-hand end of tube 3, it is reinforced to some extent by reflection.

The behavior of the individual frangible discs is not consistent enough to permit operation of the valves 13–15 (or rotation of a valve disc, if one is used) at a constant speed. Therefore, the process gas inlet valve 2 and the valves 13–15 are operated by a cycle timer 10 which is triggered or set into operation only by the actual appearance of the shock wave in tube 3. The shock wave, traveling down the tube 3, causes a high pressure front to move down the tube, since the temperature of the gas is increased by this wave and since the tube does not change in volume. A pressure transducer or pickup 19 is mounted along the length of the tube 3, this pickup sending a signal to cycle timer 10 when the shock wave passes the location of the pickup. The signal from transducer 19 triggers or sets into operation the cycle timer 10, which then causes a programmed operation of the valves and tape to take place. First, the timer 10 causes valve 13 to open, for removal of the product gases from tube 3 through line 16; this first action produced by timer 10 takes place slightly after the shock wave reaches the right-hand end of tube 3. Next, timer 10 causes valve 13 to close and valve 14 to open, to withdraw or remove the used driving gas unreacted charge gas from tube 3 through line 17. Next, timer 10 causes valve 14 to close and valves 2 and 15 to open, to allow a new charge to enter tube 3 by way of line 1, and sweep out or purge the remaining gases by way of line 18. Meanwhile, timer 10 has caused tape drive 9 to move tape 7 so as to bring a new disc closure into position in front of tube 3, thereby allowing compression chamber 5 to recharge with pressured driving gas, and this recharging takes place until the new disc closure ruptures.

As previously stated, the buildup of pressure in chamber 5 is delayed by the orifice inlet 6. This allows time for the new frangible disc to be moved into place by tape 7.

If desired, the tape 7 can be run at constant speed, rather than having it controlled by timer 10, since the tape speed can be much slower than the valve operations.

It will be recalled that the wave engine of the present invention utilizes a stationary shock tube. This greatly simplifies and eases the measurement of temperature and pressure inside the tube, as compared to a wave engine wherein the shock tube rotates at a high rate of speed. Also, the present engine requires no high-speed, rotating seals, as are necessary with the prior, rotating-tube engine; the seals 12 of this invention are relatively simple and involve only slowly-moving parts. The gas losses are kept to a minimum, because the seals utilized can be made tight; the tape 7 can be moved in actual contact with the tube 3. With a stationary tube, also, the heat exchange from the tube can be very easily accomplished. In the present engine, the moving parts (valves used for the expansion cycle only) are smaller, slower-moving, and not as critical.

With a stationary shock tube, as in the present invention, there is no limitation on the length and size of the shock tube (as there is with a high-speed rotating tube). Therefore, in an engine of the present type, although there would perhaps be less reactions per unit time than in a smaller high-speed rotating tube, there could be as much total reacted gas output per unit time. That is to say, the tube of the present invention could be made sufficiently large to compensate for its slower overall reaction cycle.

The invention claimed is:

1. In a wave engine, an elongated reaction tube, means for supplying a charge gas thereto, a frangible closure sealing one end of said tube, means supplying a driving gas under pressure to the outer surface of said closure to rupture such closure, the rupture thereof causing driving gas to enter said tube to create a shock wave therein; means operable selectively to remove gaseous reaction products or to remove driving gas from the other end of said tube, timing means for operating the last-mentioned means, thereby to effect the selection on a basis of elapsed time from a reference instant, and means responsive to the passage of the shock wave past a certain point along the length of said tube to trigger said timing means, thereby to establish said reference instant.

2. In a wave engine, an elongated reaction tube, means for supplying a charge gas thereto, a movable tape mounted to move across one end of said tube, said tape carrying a plurality of frangible discs movable by said tape to form successive individual closures for said one end of said tube; means supplying a driving gas under pressure to the outer surface of a disc closure to rupture such closure, the rupture thereof causing driving gas to enter said tube to create a shock wave therein; valved means for removing gaseous reaction products from the other end of said tube, and timing means operating to cause movement of said tape, to move an imperforate frangible disc into position as a closure, at the end of a preset time interval beginning at a reference instant.

3. Combination set forth in claim 2, including also means responsive to the passage of the shock wave past a certain point along the length of said tube to trigger said timing means, thereby to establish said reference instant.

References Cited by the Examiner

UNITED STATES PATENTS 2,690,960 10/1954 Kistiakowsky ____ 23—259.5 X
2,958,716 11/1960 Lahr et al. _____ 23—209.7 X MORRIS O. WOLK, *Primary Examiner.*

JAMES H. TAYMAN, JR., *Examiner.*